United States Patent [19]

Sugalski

[11] 4,237,409

[45] Dec. 2, 1980

[54] MULTIPLE-BATTERY BATTERY CHARGER

[75] Inventor: Raymond K. Sugalski, Gainsville, Fla.

[73] Assignee: General Electric Company, Gainsville, Fla.

[21] Appl. No.: 902,671

[22] Filed: May 4, 1978

[51] Int. Cl.³ .......................................... H01M 10/46
[52] U.S. Cl. ...................................... 320/2; 221/135; 320/48
[58] Field of Search ................. 320/2, 3, 4, 48; 221/2, 221/66, 135; 340/636

[56] References Cited

U.S. PATENT DOCUMENTS

| | | | |
|---|---|---|---|
| 2,424,059 | 7/1947 | Scott | 340/636 X |
| 2,451,726 | 10/1948 | Fry . | |
| 3,171,568 | 3/1965 | Arwine | 320/4 X |
| 3,421,142 | 1/1969 | Kircher . | |
| 3,435,318 | 3/1969 | Mas . | |
| 3,675,108 | 7/1972 | Nicholl | 320/2 |
| 3,696,283 | 10/1972 | Ackley | 320/15 X |
| 3,746,961 | 7/1973 | Doble . | |
| 4,009,429 | 2/1977 | Mullersman . | |
| 4,173,733 | 11/1979 | Sugalski et al. | 320/2 X |

Primary Examiner—Robert J. Hickey
Attorney, Agent, or Firm—Morgan, Finnegan, Pine, Foley & Lee

[57] ABSTRACT

A multiple-cell battery charger includes a housing having an open end leading to a chamber in the housing and adapted to receive battery cells of a pre-determined size in side-by-side abutting relation and another end having an opening which is adapted to retain the battery cells in said housing but permit removal when desired, one at a time, in a first in, first out order. An elongate negative contactor strip and an elongate positive connector buss strip are coupled to the leads of a D.C. power supply source and are positioned along opposite sides in the housing. The negative strip is formed with detent contact portions, each for making electrical contact with the negative terminal of a cell. Contact members are electrically coupled to the positive connector strip and are positioned to contact the positive terminal of individual cells. As preferably embodied, each contact member includes a heat generating circuit element, and a liquid crystal indicator is mounted to the housing, adjacent each heat generating circuit element.

14 Claims, 16 Drawing Figures

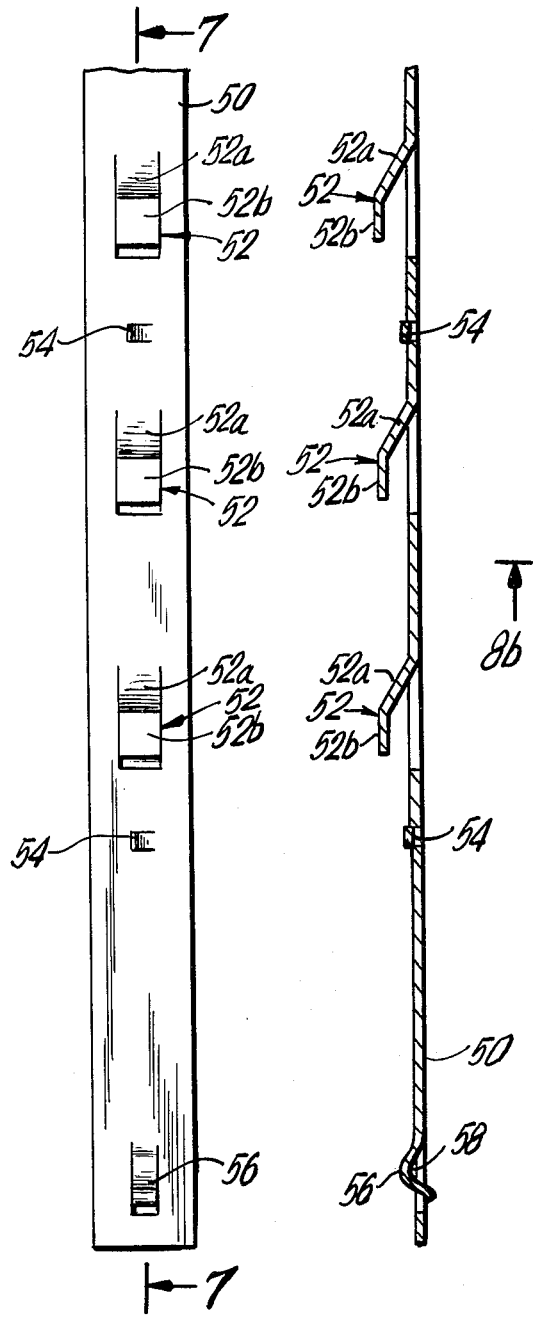
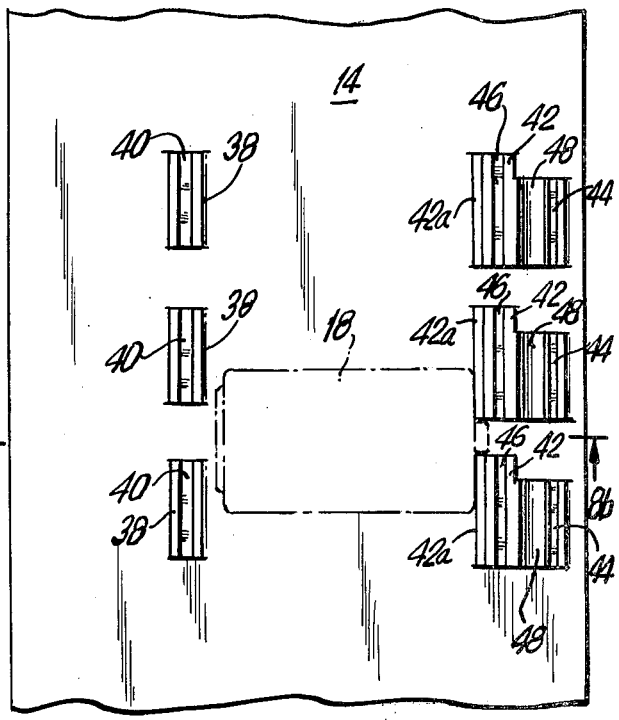
FIG. 8a
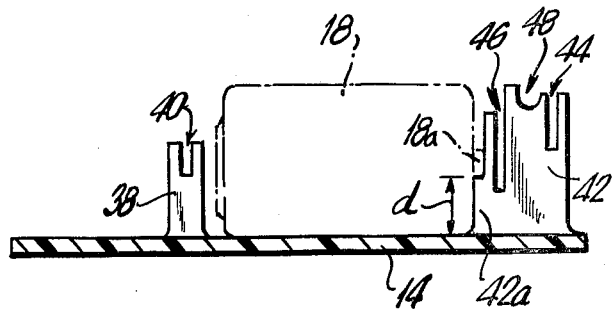
FIG. 6   FIG. 7   FIG. 8b

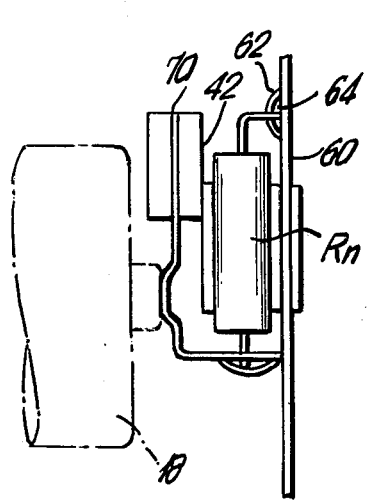
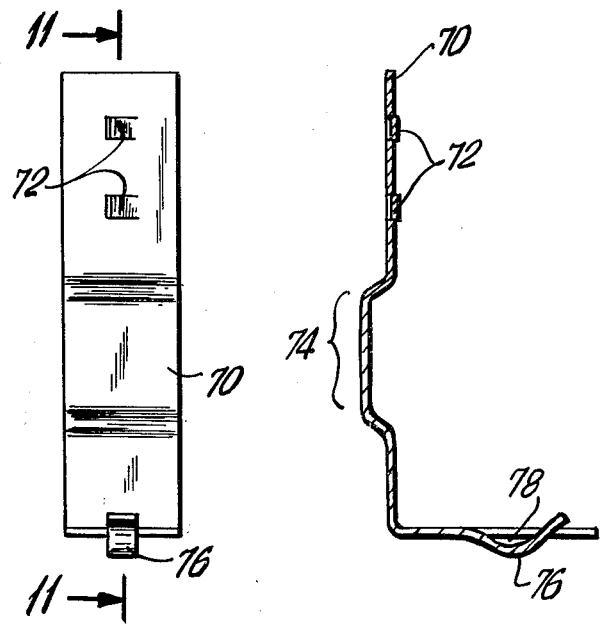
FIG.9  FIG.10  FIG.11
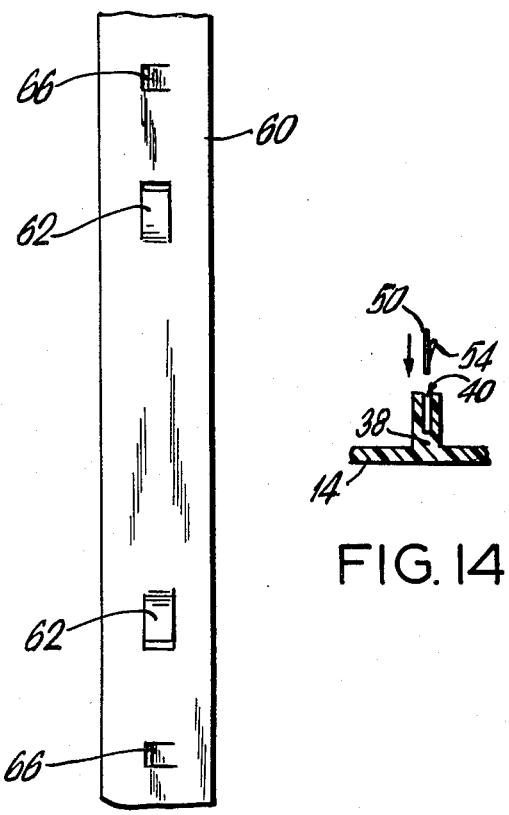
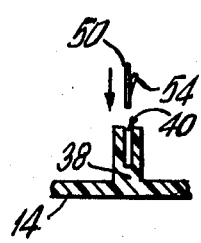
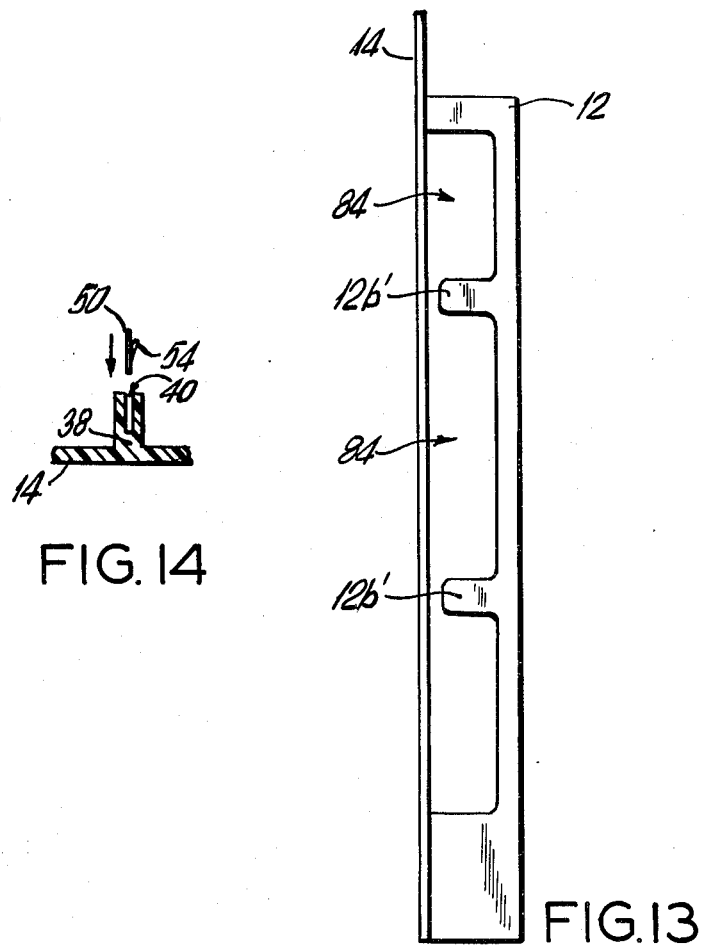
FIG.12  FIG.14  FIG.13

MULTIPLE-BATTERY BATTERY CHARGER

BACKGROUND AND OBJECTS OF THE INVENTION

The present invention relates generally to rechargeable batteries, and, more particularly to a battery charger for simultaneously charging a plurality of battery cells.

In the relatively recent past, an increasing number of battery operated devices, such as radios, children's toys, flashlights and the like are being powered by rechargeable secondary cells. Rechargeable secondary cells offer a particularly advantageous cost savings over primary cells (i.e., ordinary dry cell batteries) since the latter have a relatively short useful life, dissipating all their electrical energy and requiring repeated replacement during the life of the device powered thereby.

In view of the increasing use of rechargeable batteries, battery charging devices are needed which are relatively inexpensive to fabricate and are adapted to charge several battery cells simultaneously. Such charging devices are needed, for example, in stores where the batteries are sold to keep the batteries fully charged for immediate use by the consumer. In addition, these multi-cell charging devices will find substantial application in the home where the increasing uses of these batteries demands such facilities.

Multi-cell charging devices, such as the charging modules disclosed in U.S. Pat. No. 4,009,429 which is assigned to the same assignee as the present patent application, have been proposed for charging two or more rechargeable cells. Although such devices provide satisfactory results for many applications, they are capable of simultaneously charging a relatively small number of cells.

One prior art attempt at providing a charging apparatus for a varying number of battery cells is disclosed in U.S. Pat. No. 3,696,283 wherein a plurality of two-battery charging modules can be releasably coupled together. Although this apparatus may provide adequate results for some applications, it does suffer certain disadvantages. The apparatus is not formed as a convenient unitary device but, rather, requires several separate modular structures which must be stored together. It thereby involves substantial fabrication costs, particularly for the materials. In addition, without the power supply module, the other modules are useless.

Accordingly, it is an object of the present invention to provide a new and improved multiple-cell battery charger. It is another object of the present invention to provide a new and improved multiple-cell battery charger adapted to be made from relatively inexpensive component parts.

It is also an object of the present invention to provide a new and improved multiple-cell battery charger fabricated from parts which, except for the electronic components, can be inexpensively mass produced.

It is a further object of the present invention to provide a new and improved multiple-cell battery charger, wherein the terminals of batteries inserted into the charger are automatically positioned in proper registration with the electrical contacts of the charging conduit.

It is yet another object of the present invention to provide a new and improved multiple-cell battery charger, wherein the first cell placed therein for charging is the first cell to be removed.

It is an additional object of the present invention to provide a new and improved multiple-cell battery charger which includes relatively simple and inexpensive indicator means for indicating when a cell is being charged.

It is still another object of the present invention to provide a new and improved multiple-cell battery charger having a unitary structure capable of receiving a varying number of battery cells.

It is yet an additional object of the invention to provide a new and improved multiple-cell battery charger wherein the presence of a defective cell therein will not prevent other cells from being recharged.

Objects and advantages of the invention are set forth in part above and in part below. In addition, these and other objects and advantages of the invention will become apparent herefrom or may be appreciated by practice with the invention, the same being realized and attained by means of the instrumentalities and combinations pointed out in the appended claims. Accordingly, the invention resides in the novel parts, constructions, arrangements, combinations and improvements herein shown and described.

SUMMARY OF THE INVENTION

Briefly described, the multiple-cell battery charger according to the present invention includes a housing which provides a relatively elongate battery-retaining chamber adapted to retain a plurality of rechargeable battery cells in side-by-side abutting relationship. Electrical conductor means are provided within the chamber, which are adapted to make electrical contact with the positive and negative battery terminals and to connect the cells in parallel with a suitable source of charging current. The charging conductor means include a unitary negative contactor strip coupled to one lead of the charging source and adapted to make electrical contact with the negative terminal of each battery, and a positive conductor/contactor assembly coupled to the other lead of the charging source and adapted to make contact with the positive terminal of each battery, to provide parallel charging circuits among the power source and the cells.

As preferably embodied, the positive conductor/contactor assembly includes an elongate positive connector strip coupled to the lead of the charging source, with contact members coupled thereto and positioned to make contact with the positive terminal of batteries. The contact members preferably include heat generating circuit elements which produce heat in response to the flow of current. Liquid crystal indicator means which change color in response to changes in temperature are mounted to the charger housing adjacent heat generating elements which can be either diodes or resistors.

In a preferred embodiment, the charger housing includes a front cover and a back member, defining the charger chamber which has a thickness equal to about the diameter of the cells the charger is intended to accommodate and a width, as defined between the positive and negative conductors, equal to the length of the cells. In addition, the back member is formed with lug means adapted to retain the negative contactor strip, the positive buss conductor member and the circuit elements in fixed positions within the housing. The lug means may also be adapted to positively locate the heat generating elements adjacent the liquid crystal indicator.

It will be found that the objects and advantages specifically enumerated herein are achieved by the invention as herein embodied. Accordingly, it will be found that a multiple-cell battery charger may be provided which can be relatively inexpensively made from component parts which, except for the electronic components, can either be molded from a moldable plastic material or die stamped from simple metallic elements.

It will also be found that by providing a charger housing having a battery-retaining chamber proportioned to receive battery cells of a predetermined diameter and having electrical contact means lining the edges of the chamber, it will be found that batteries inserted into the chamber will automatically be positioned in proper registration with the electrical contacts of the charging circuit. Moreover, it will be found that cells inserted into the charger chamber will be charged despite the presence of one or more defective cells.

It will further be found that the battery charger according to the present invention permits a varying number of cells to be placed therein for charging without requiring additional housings or modules. In addition, it will be found that the battery charger according to the present invention enables the first cell placed in the battery-retaining chamber to be the first removed.

Additionally, it will be found that by mounting a liquid crystal indicator on the housing front cover, adjacent heat generating circuit elements, a relatively inexpensive and convenient means are provided for indicating when cells are being charged.

It will be understood that the following description is explanatory of the invention and is not intended to be restrictive thereof. Accordingly, the accompanying drawings, referred to herein and forming a part hereof, illustrate a preferred embodiment of the invention and, together with the description, serve to explain the principles of the invention.

BRIEF DESCRIPTION OF THE DRAWINGS

FIG. 6 is an elevation view of part of a battery charger conductor according to the present invention.

FIG. 7 is a sectional view taken along section 7—7 of FIG. 6.

FIG. 8a is an elevation view of part of the back member of the charger housing shown in FIG. 1.

FIG. 8b is a sectional view taken along section 8b—8b of FIG. 8a.

FIG. 9 is an enlarged elevation view of another battery charger conductor assembly according to the present invention.

FIG. 10 is an elevation view of one conductor element shown in FIG. 9.

FIG. 11 is a sectional view taken along section 11—11 of FIG. 10.

FIG. 12 is an elevation view of another conductor element shown in FIG. 9.

FIG. 13 is a side elevation view of the left side of the structure shown in FIG. 1.

FIG. 14 is a sectional view of part of the structure shown in FIG. 8b.

DETAILED DESCRIPTION OF A PREFERRED EMBODIMENT

Figure 1:
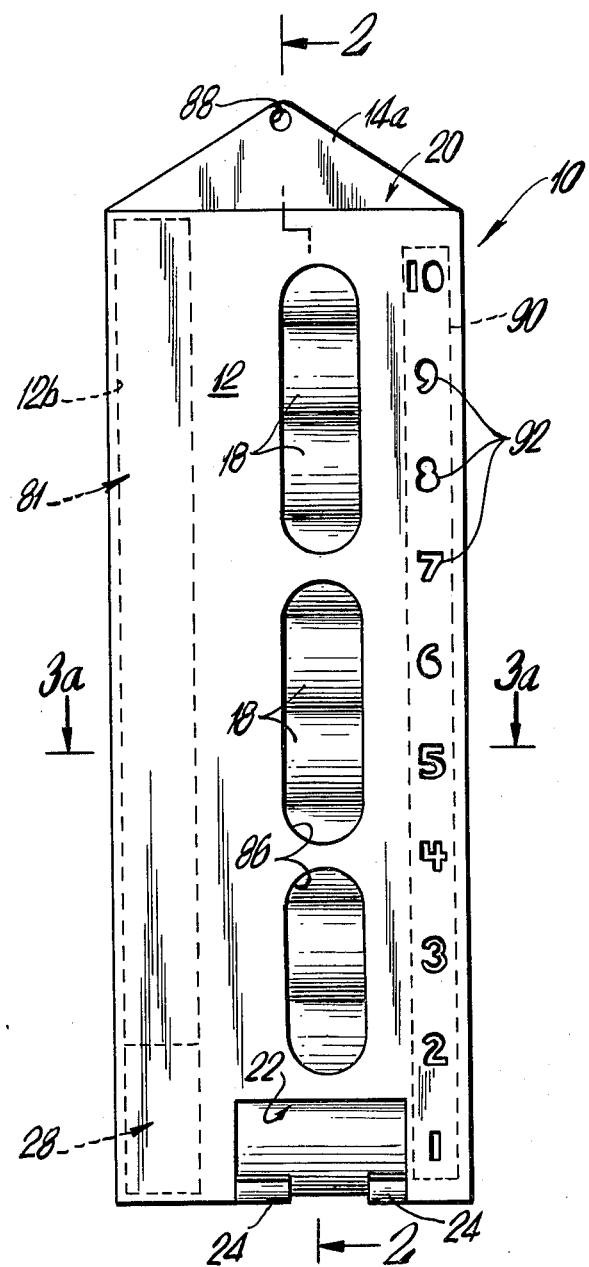
FIG. 1 is a front elevation of a battery charger housing made in accordance with the present invention.
Figure 2:
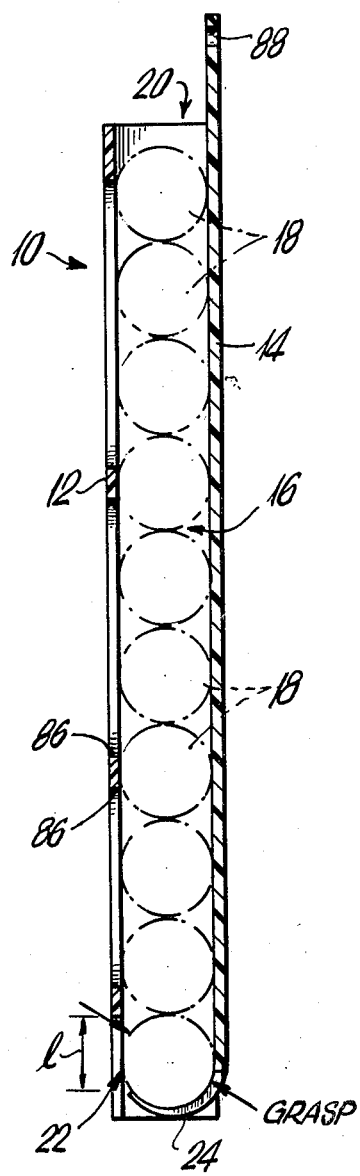
FIG. 2 is a sectional view taken along section 2—2 of FIG. 1.

Referring now generally to drawings hereof, wherein like reference characters refer to like parts throughout the various views, there is shown in FIGS. 1 and 2 a housing (indicated generally at 10) for an embodiment of the battery charger according to the present invention. As here embodied, housing 10 includes front cover 12 and back member 14 which, together, provide a generally enclosed charger chamber (indicated at 16) adapted to receive and retain a plurality of battery cells 18 for charging.

As preferably embodied, chamber 16 is proportioned to retain battery cells abutting each other, side-by-side, in a generally continuous line at predetermined charging locations. To this end, the chamber 16 (and, therefore, housing 10) is about as thick and as wide as the diameter and length, respectively, of cells 18 to be charged therein, but is long enough to accommodate a plurality of cells 18. As here embodied, housing 10 is rectangular in cross-section (FIG. 2), although it will be understood that housing 10 could, for example, have a serpentine cross-sectional configuration to accommodate numerous cells 18 in a somewhat confined area.

Housing 10 is formed with an opening (indicated at 20) at its top adapted to provide an inlet for the introduction of battery cells into chamber 16 and is, therefore, proportioned to permit free insertion of battery cells. Housing 10 is also formed with another opening (indicated at 22) to provide access to the battery cells held in housing 10 for removal thereof. In order to retain battery cells in chamber 16 for charging, exit opening 22 is formed in front cover 12, and, back member 14 is formed with arcuit fingers 24 which serve to hold the batteries and prevent them from falling out of housing 10.

As preferably embodied, the free end edge of each finger 24 is spaced from the edge of exit opening 22 by a distance (indicated at l in FIG. 2) which is slightly less than the diameter of the size batteries to be charged in the particular housing 10. Thus, the lowermost battery (i.e., the first placed in housing 10) will be prevented from being pushed out of the housing due to the weight of the other batteries on top of the first battery. In addition, fingers 24 are advantageously spaced apart, as shown in FIG. 1, in order to facilitate removal of the lowermost battery cell, when desired, by permitting the battery to be grasped from the front and bottom (as indicated by the arrows in FIG. 1) and pulled out through opening 22. To this end, fingers 24 are preferably adapted to be resilient and somewhat flexible to deflect when a battery cell is pulled out of opening 22, yet securely retain the batteries during the charging operation.

Figure 4:
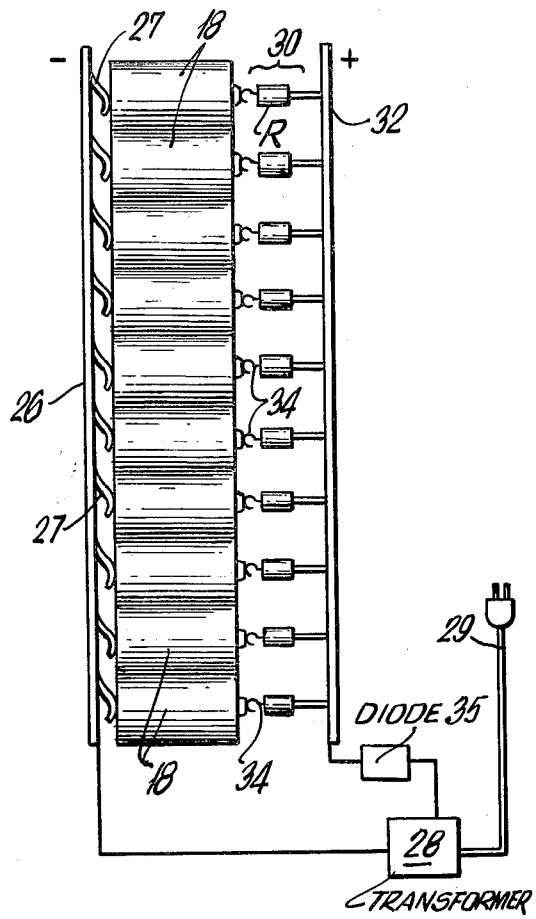
FIG. 4 is a schematic diagram of a battery charger according to the present invention.
Figure 5:
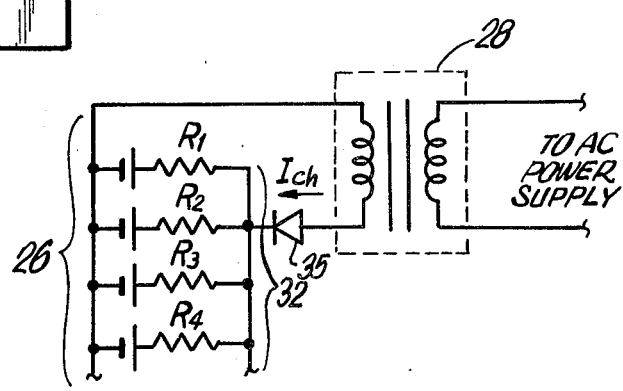
FIG. 5 is a partial circuit diagram corresponding to the schematic shown in FIG. 4.

Turning now to FIGS. 4 and 5, there are shown schematic diagram and a circuit diagram, respectively, for the electrical components of the battery charger according to the invention. Advantageously, housing 10 is adapted to apply an electrical charging current in parallel across each battery cell 18 placed in charger housing 10. To this end, the charger includes a single electrical contact member, or the negative contactor member (indicated at 26), adapted to make contact with the negative terminal of each battery cell 18 placed in housing 10, as by projecting contacting portions 27 extending outwardly from contactor member 26. Contactor member 26 is coupled to one lead of transformer 28 (or any other suitable source of charging current) which, in turn, is coupled to a suitable A.C. power source and adapted to provide a charging current sufficient to charge all the battery cells 18 coupled in parallel thereto, without overcharging them.

A plurality of circuit elements, each indicated at 30, are preferably coupled to another unitary electrical conductor member, or the positive buss conductor member (indicated at 32), so as to form a plurality of parallel circuits with contactor member 26 when cells are positioned in electrical contact between contact elements 27 of member 26 and correspondingly positioned circuit elements 30.

As preferably embodied, each circuit element 30 includes a contact member 34 and a heat generating element (indicated at $R_1, R_2 \ldots R_n$) coupled in series. Contact members 34 are adapted to make electrical contact with the positive terminal of battery cells positioned in registration therewith and each element, $R_n$, is adapted to generate heat when current flows therethrough (i.e. while its corresponding battery cell 18 is being charged). In addition, positive buss conductor 32 is coupled to the other lead of transformer 28 with diode 35 which is adapted to permit flow of the charging current, $I_{ch}$, (as distinguished from the flow of electrons) in the direction indicated in FIG. 5.

Turning now to FIGS. 8a and 8b, there are shown portions of a preferred embodiment for back member 14 of housing 10. Advantageously, back member 14 is formed with a plurality projecting lug-like members 38 adapted to retain negative contactor member 26 in fixed position in housing 10. To this end, each lug 38 is formed with a slot 40 proportioned to grasp negative contact member 26 and retain it in an essentially fixed position, as will become more evident from the description below.

Similarly, back member 14 is also provided with a number of projecting lugs 42 (equal in number to the number of cells housing 10 is capable of charging at a given time) adapted to retain circuit elements 30 and positive buss conductor member 32 in fixed positions in housing 10. To this end, each lug 42 includes a slot 44 proportioned to grasp a portion of positive buss conductor member 32 and retain it in an essentially fixed position (as explained more fully below) and a slot 46 adapted to grasp a contact element 34 (also described more fully below) for retaining it in an essentially fixed position. Also as preferably embodied, each lug 42 includes a depression (indicated at 48) which is proportioned to support and positively locate a corresponding heat generating element $R_n$. Advantageously, depression 48 is proportioned and positioned to locate its corresponding element $R_n$ directly adjacent front cover 12, as will be described more fully below.

Advantageously, lug 42 also includes a projecting portion (indicated at 42a) which is proportioned to enable the positive terminal of a battery cell 18 to make contact with contact member 34, yet prevent the negative terminal of the battery cell from contacting contact member 34 in the event the battery cell is placed backwards in housing 10. To this end, portion 42a projects upwardly from back member 14 by a distance equal to about the radial distance (indicated at d in FIG. 8b) between the outer circumferential edge of the battery cell 18 and the corresponding outermost edge of the positive terminal nipple 18a. Thus, if the negative (i.e., the flat) terminal resides adjacent the positive contact member 34, portion 42 will prevent contact therebetween.

Turning now to FIGS. 6 and 7, there is shown a preferred embodiment of negative contactor member 26. Advantageously, contactor member 26 comprises an elongate strip 50 of resilient, electrically conductive material, such as spring tempered nickel-plated steel (about 0.015" thick), and is formed with a plurality of contact detent members (indicated at 52) projecting outwardly from strip 50. Detent members 52 are also adapted to be resiliently biased against strip 50 for making electrical contact with the negative terminal of an equal number of battery cells 18.

Accordingly, as here embodied, each detent member 52 is preferably die stamped from strip 50, thereby forming a contact portion 52a attached to strip 52 by a sloping hinge portion 52b. Advantageously, when strip 50 is installed in housing 10, each sloping portion 52b slopes angularly outwardly from strip 50 in the direction of insertion of the battery cells 18 to permit each cell to pass by each detent members 52 by depressing same, until the cell rests against another battery in housing 10.

Strip 50 also includes means for being fixedly retained within slots 40. To this end, barb-like detent members 54 (which are smaller than detent members 52) are preferably die stamped from strip 50 and extend outwardly therefrom to provide a thicker portion in strip 50, which is thicker than the width of slot 40 in lug 38. Detent members 54 slope angularly outwardly from strip 50 in a direction parallel to its width. Accordingly, strip 50 may be installed in housing 10 by inserting it into slots 40 so that detent members 54 reside in slots 40, but with the free end edges of detent members 54 pointing up from slots 40, as indicated in FIG. 14. In this way, strip 50 can be easily inserted into the slots 40, but, when removal of strip 50 from slots 40 is attempted, the free end edges of detents 54 bite into the side walls of slots 40 to prevent removal.

Also as shown in FIGS. 6 and 7, strip 50 may be formed with an addition clip-like flange member (indicated at 56) to retain a conductor wire from transformer 28 inserted in the eye (indicated at 58) formed thereby. As here embodied, flange member 56 is die stamped from one end of strip 50 and bent back to form eye 58 for retaining the conductor wire.

Turning now to FIG. 12, there is shown a preferred embodiment of positive buss conductor member 32. Buss conductor 32 is formed from a strip (indicated at 60) of resilient electrically conductive material similar to strip 50 described above. In addition, strip 60 is formed with a plurality of clip-like flange members 62 which are essentially identical to flange member 56 on strip 50, forming eyes 64 for receiving and resiliently grasping a conductor wire from a heat generating element, $R_n$. Strip 60 is also formed with several detent members 66 which are preferably die stamped therefrom and are essentially identical to detent members 54 of strip 50, for wedging into the walls of a slot 44 in lugs 42 to prevent removal therefrom.

Turning next to FIGS. 10 and 11, there is shown a preferred embodiment of contact element 34, according to the present invention. As here embodied, contact element 34 is made from an L-shaped strip (indicated at 70) of resilient, electrically conductive material similar to strips 50 and 60. It is formed with at least one, and preferably two, detent members 72 which are preferably die stamped from strip 70 and are essentially identical to detent members 54 and 66 both described above, for wedging against the walls of slots 46 and preventing removal therefrom, in essentially the same manner as described above with respect to FIG. 14.

Strip 70 is also formed with a bulging portion (indicated at 74) adapted to project into chamber 16 to make electrical contact with positive terminal 18a of a battery cell 18. However, bulging portion 74 is preferably proportioned to protrude into chamber 16 but not beyond or even with the inside surface of lug 42 so that it is incapable of contacting a negative battery terminal of a battery which has been inserted backwards, as described above. In addition, the free leg of strip 70 is formed with a clip-like flange 76 die stamped therefrom and essentially identical to clip-like flanges 62 and 56, to form eye 78 for receiving and resiliently grasping the other conductive lead of an element, $R_n$.

Figure 3A:
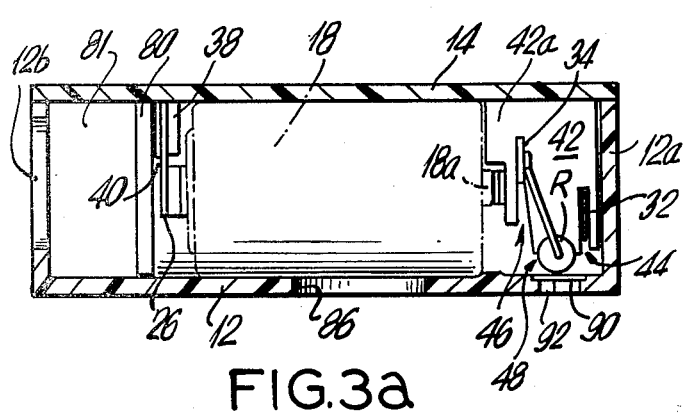
FIG. 3a is a sectional view taken along section 3a—3a of FIG. 1.
Figure 3B:
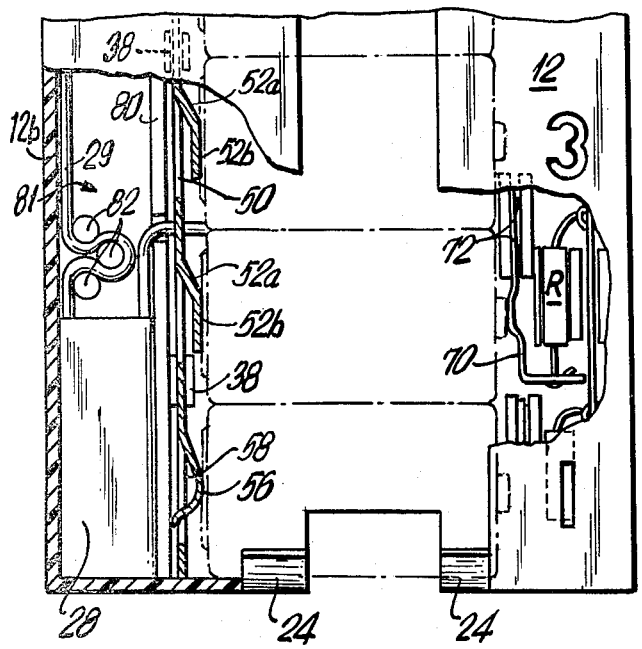
FIG. 3b is an enlarged, partially exploded front elevation of the bottom portion of the housing shown in FIG. 1.

Accordingly, the herein-described embodiment of the battery charger according to the present invention is assembled by inserting strip 50 into the slots 40 of lugs 38, to form negative contactor 26. The flat surface portions 52a of each detent member 52 are positioned to correspond to the anticipated position of a negative battery terminal when housing 10 is filled to capacity, beginning with a first cell resting on curved fingers 24. Each L-shaped strip 70 is similarly inserted into the slot 46 of its corresponding lug 42, with contact bulge 74 positioned opposite a corresponding contact portion 52a on negative contactor 26, for contacting the positive terminal of a cell 18. The heat generating elements, $R_n$, are placed in their corresponding supporting indentations 48, with their lead conductors coupled between a clip flange 62 of positive buss conductor 32 (i.e., strip 60) and a clip flange 76 on contact element 34 (i.e., strip 70). A portion of an assembled charger according to the present invention is shown in FIGS. 3a and 3b.

As preferably embodied, the number of lugs 38 is equal to the number of lugs 42, which number is equal to the number of batteries housing 10 will be capable of retaining. Thus, negative contactor member 26 will be rigidly supported in housing 10 for providing a suitable bearing member against which contact detent members 52 can bear.

Once the electrical portions of the charger are installed, the front cover 12 and back member 14 are secured together to form an enclosed housing 10. To this end, either the front cover or the back member (preferably front cover 12) is formed with depending side walls (indicated at 12a and 12b) for enclosing the charger. Advantageously, front cover 12 and back member 14 are formed from an injection moldable plastic material such as polypropylene, acrylobutylstyrene, "DELRIN" sold by I. E. du Pont de Nemours (all preferably fiber reinforced) or high impact polystyrene. Thus, it will be understood that, cover plate 12 and back member 14 can be affixed to each other by any suitable bonding agent or, preferably, by ultrasonic welding.

Advantageously, housing 10 may be adapted to contain transformer 28, diode 35 as well as power cord 29 for transformer 28. To this end, back member may be formed with a false wall (indicated at 80) for separating battery containing cavity 16 from end wall 12b, thereby to provide storage space 81 therebetween for accommodating transformer 28, diode 35 and, particularly, power cord 27.

In addition, it will be understood that side walls 12a and 12b are porportioned to separate front cover 12 from back member 14 by a distance (as determined from their interior surfaces) equal to about the diameter of the cells which the charger is designed to accommodate. Thus, the battery cells to be charged will be held in proper alignment for making contact with the charging terminals.

Advantageously, back member 14 may include three closely spaced pillars 82 projecting upwardly therefrom, as shown in FIG. 3b. Accordingly, power cord 29 can be wrapped around and among pillars 82 (as shown) for preventing it from being inadvertently pulled out of transformer 28 or from overstressing the connection therebetween. Also, as shown in FIG. 13, side wall member 12b may be formed with substantial open, or cut-out, portions (indicated at 84) for enabling power cord 29 to be inserted into and removed from storage space 81. To this end, projecting wall finger portions 12b' are spaced from back member 14 to enable passage of power cord 29 therebetween.

In addition, front cover 14 may be formed with openings 86 for viewing the number and position of battery cells being charged in the charger. In addition, back member 14 may be formed with extending portion 14a adapted to extend beyond front cover 12 to enable, for example, provision of an aperture 88 for hanging housing 10 from a hook or the like, as a display case.

As preferably embodied, heat responsive current indicator 90 is mounted to front cover 12, adjacent each resistor, $R_n$, to indicate when charging current is flowing through any of the resistors, in response to the heat generated in the resistors by such current flow, thus indicating whether the corresponding battery cell 18 is being charged. Advantageously, indicator 90 is an elongate strip including a micro-encapsulated cholesteric liquid crystal material, such as is commercially available from Djinnii Industries, Dayton, Ohio, preferably having a visually detectable color change indicative of the flow of charge current in ambient temperatures between, for example, 50° F. and 90° F. or any other desired range.

Advantageously, strip 90 is mounted to the inside surface of front cover 12 adjacent the heat generating elements, $R_n$ for maximum response to heat generated therein. In addition, cover 12 is formed with openings (indicated at 92) which may be in the shape of indicia characters, each adapted to be located adjacent an element, $R_n$, and correspond to a particular battery cell by position in housing 10, with strip 90 positioned behind openings 92. Thus, a visually detectable change in color is provided by indicator 90, as viewed through openings 92, in response to a change in temperature of the adjacent heat generating element due to the flow of charging current.

The change in color can be perceived, for example, by comparison to a strip portion visible through an opening 92 which corresponds to an unoccupied charging position. Alternatively, a portion of strip 90 may be placed in an opening (not shown) which does not correspond to a charging position, so that it always reflects the ambient temperature color for comparsion with the strip portions visible through openings 92. However, if the area of contact between heat generating elements, $R_n$, and the strip 90 is small compared to the area of strip 90 which is visible through openings 92 (e.g., in the ratio of about ¼), the change in color can be perceived as a dot (of about the size of the area of element, $R_n$, in contact with strip 90) of different color relative to the remaining portion of the strip in opening 92, which portion will show the ambient temperature color.

Once a particular cell has been fully charged, current may cease flowing through the cell so that the heat generating element ($R_n$) will not longer be heated and the liquid crystal indicator will return totally to the ambient temperature color, thereby indicating that the cell is charged. However, an "overcharge" current may continue to flow through the fully charged cells, which will not damage the cells. Thus, the liquid crystal will continue to display an elevated temperature color.

Accordingly, it will be found that the battery charger according to the present invention provides convenient, self-contained device for charging a varying number battery cells, without having to insert pairs of cells to complete a charging circuit. The cells are introduced through inlet 20 and drop past contacts 52 until positioned either against finger members 24 (for the first cell introduced) or against another cell. The cells are automatically positioned with their terminals in contact with a pair of corresponding charging terminals of the charger and the charging current is automatically applied to the cell until it is completely charged. Moreover, indicator 90 automatically shows when cells are being charged. Once charged, the cells can be easily removed from housing 10 through opening 22, in first-in-first-out fashion.

It will be readily appreciated by those skilled in the art that the invention in its broader aspects is not limited to the specific embodiment herein shown and described. For example, diode 35 may be replaced by any suitable electrical component for converting alternating current to direct current to be applied to the cells, and any conventional charging means may be utilized in place of transformer 28 (and diode 35) for applying a suitable charging current to the cells.

In addition, it will be understood that heat generating elements, $R_n$, may be resistors or diodes. Also, the front and back housing member may be snap-fit together, rather than bonded or sonic welded, by, for example, suitable leg members formed on one housing member, adapted to engage slots formed in the other housing member.

Accordingly, variations may be made from the embodiment herein shown, which are within the scope of the accompanying claims, without departing from the principles of the invention and without sacrificing its chief advantages.

What is claimed is:

1. A battery charger for simultaneously charging a plurality of cells, comprising:
    a charger housing having a generally elongate chamber adapted to contain a plurality of battery cells in generally side-by-side abutting relation, said housing having an essentially completely open inlet end for introducing battery cells into said chamber and an outlet end for removing battery cells from said chamber;
    at least one resiliently deflectable support finger at said outlet end for holding all said battery cells in said chamber, yet permitting removal of one battery cell adjacent said outlet end when desired by resiliently yielding when said one battery cell is pulled from said outlet end; and
    electrically conductive means in said housing for connection to a source of charging current, said conductive means including portions that are positioned along opposite sides of said chamber to supply current, in parallel, to battery cells in said housing, such that any desired number of battery cells may be charged by insertion into said housing through said inlet end and charged when said conductive means are connected to a power source, and, charged cells may be removed from said housing through said outlet.

2. A battery charger according to claim 1 which further includes indicator means for indicating when current is flowing through each battery cell in said chamber, said indicator means being at least partially electrically separated from said conductive means and circuitry associated therewith.

3. A battery charger for simultaneously charging a plurality of cells, comprising:
    a charger housing having a generally elongate chamber adapted to contain a plurality of battery cells in generally side-by-side abutting relation, said housing having an inlet end for introducing battery cells into said chamber and an outlet end for removing battery cells from said chamber;
    indicator means for indicating when current is flowing through each battery cell in said chamber, said indicator means including a liquid crystal material;
    heat generating means electrically coupled to said electrically conductive means, said heat generating means adapted to generate heat in response to the flow of charging current through a battery cell to cause said liquid crystal material to undergo a change in color in response to the heat; and
    electrically conductive means in said housing for connection to a source of charging current, said conductive means positioned along opposite sides of said chamber to supply current, in parallel, to battery cells in said housing, such that battery cells to be charged may be inserted into said housing through said inlet and charged when said conductive means are connected to a power source, and, charged cells may be removed from said housing through said outlet.

4. A battery according to claim 3 wherein said heat generating means comprise a plurality of resistors coupled to said electrically conductive means to be in electrical series with a battery cell placed in said housing.

5. A battery charger according to claim 1 wherein said electrically conductive means comprise:
    a generally elongate strip of electrically conductive material adapted to make electrical contact with one terminal of each battery cell in said housing; and
    a plurality of distinct electrically conductive elements, each mounted to said housing separately from each other and each adapted to make electrical contact with the other terminal of one battery cell in said housing, said conductive elements electrically connected together so as to form parallel electrical circuits with the power source.

6. A battery charger according to claim 5 wherein said housing comprises:
    a back member adapted to retain said elongate strip and said conductive elements is essentially fixed positions with their corresponding contact points spaced a predetermined distance apart; and a front cover adapted to be attached to said back member to form an enclosure for retaining battery cells introduced therein in a predetermined configuration relative to each other.

7. A battery charger according to claim 6 wherein said housing back member includes:

first projection means formed thereon, said first projection means adapted to retain said elongate strip in a fixed position; and a plurality of second projection means, each adapted to retain a conductive element in a fixed position.

8. A battery charger according to claim 7 wherein said first projection means includes a plurality of slotted lug members adapted to graspingly receive said elongate strip.

9. A battery charger according to claim 8 wherein said elongate strip includes:

a number of first detent members extending therefrom and adapted to engage the slot in said slotted lug member for resisting removal of said strip from said slotted lugs, the number of said first detent means generally equal to that of said lug members and positioned to correspond thereto; and a plurality of second detent members projecting outwardly from said strip, each said second detent member being biased to make electrical contact with a terminal of a battery cell to be charged and positioned to correspond generally to the spacing between battery cells to be charged.

10. A battery charger according to claim 1 which further includes a storage space in said charger housing for storing a power cord for the charger power source.

11. A battery charger according to claim 10 wherein said storage space is formed in a side portion portion of said housing.

12. A battery charger according to claim 8 which further includes a false wall formed on said back member between a side edge thereof and one of said projection means and wherein said front member is formed.

13. A battery charger according to claim 11, which further includes at least three closely spaced pillar-like structures in said storage space, said pillar-like structures being located near the charger power source, such that the power cord can be wrapped around and among the pillar-like structures to prevent transmission of forces on the cable to the power source.

14. A battery charger according to claim 13, wherein said pillar-like structures are located so as to form a generally triangular configuration.

* * * * *

UNITED STATES PATENT AND TRADEMARK OFFICE
CERTIFICATE OF CORRECTION

PATENT NO. : 4,237,409
DATED : December 2, 1980
INVENTOR(S) : RAYMOND K. SUGALSKI It is certified that error appears in the above-identified patent and that said Letters Patent are hereby corrected as shown below:

IN THE CLAIMS:

In Claim 6, line 66, "is" should read --in--.

Signed and Sealed this

Sixth Day of April 1982

|SEAL|

Attest:

GERALD J. MOSSINGHOFF

Attesting Officer — Commissioner of Patents and Trademarks